March 28, 1939.  A. E. BRONSON ET AL  2,152,373
VALVE STEM AND METHOD OF CONSTRUCTING SAME
Filed Dec. 26, 1935  2 Sheets-Sheet 1

INVENTOR.
ADELBERT E. BRONSON
WILLIAM F. GOFF
BY  Kwis Hudson & Kent
ATTORNEYS

March 28, 1939.    A. E. BRONSON ET AL    2,152,373
VALVE STEM AND METHOD OF CONSTRUCTING SAME
Filed Dec. 26, 1935    2 Sheets-Sheet 2
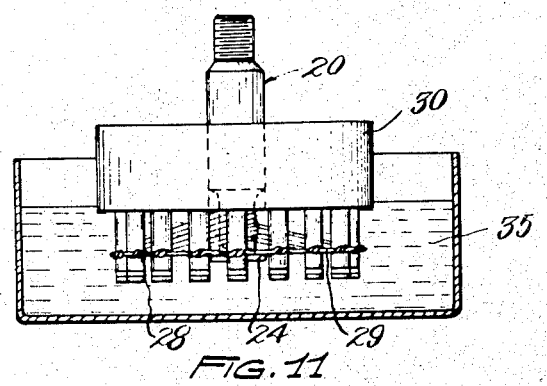
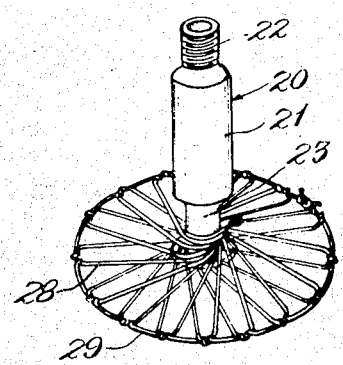
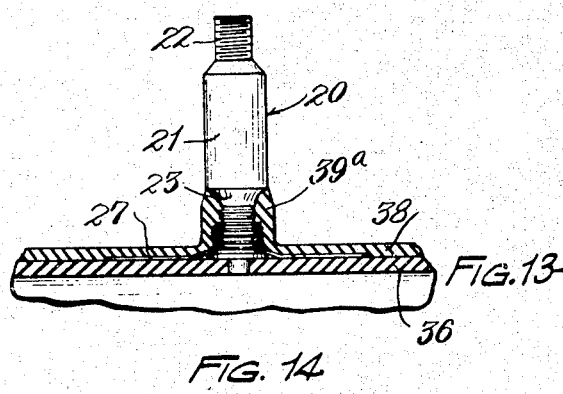
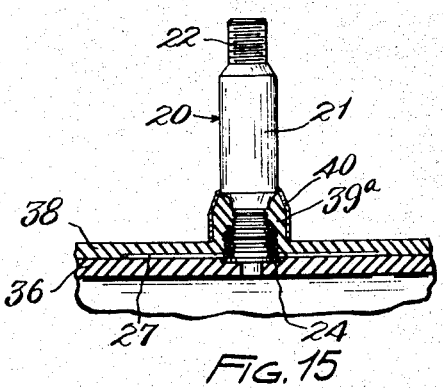
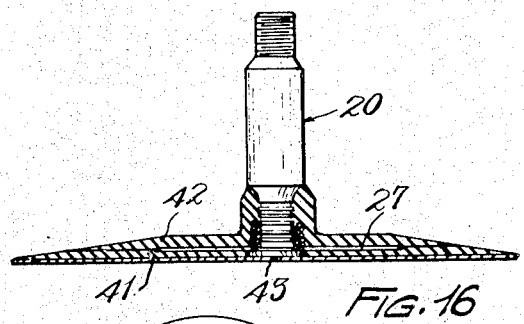
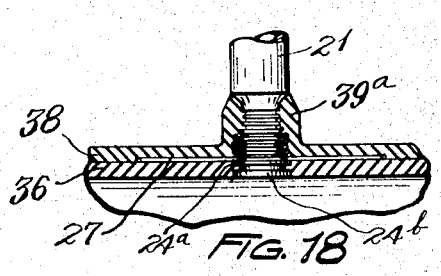
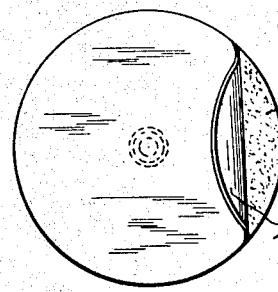
INVENTOR.
ADELBERT E. BRONSON
WILLIAM F. GOFF
BY Kwis Hudson & Kent
ATTORNEYS Patented Mar. 28, 1939

2,152,373

UNITED STATES PATENT OFFICE 2,152,373

VALVE STEM AND METHOD OF CONSTRUCTING SAME

Adelbert E. Bronson, Shaker Heights, and William F. Goff, Akron, Ohio, assignors to The Dill Manufacturing Company, Cleveland, Ohio, a corporation of Ohio Application December 26, 1935, Serial No. 56,220

16 Claims. (Cl. 154—14)

This invention relates to a valve stem and a method of constructing the same.

The valve stem embodying the present invention is for use upon inflatable articles, particularly inflatable articles such as pneumatic tires or the inner tubes used in pneumatic tires for motor vehicles, although it will be understood that the invention is applicable to other forms of inflatable rubber articles.

The present invention constitutes an improvement upon and an addition to the inventions disclosed in the copending applications of A. E. Bronson, Serial Number 39,593, filed September 7, 1935, and Serial Number 53,383, filed December 7, 1935.

An object of the invention is to provide an improved valve stem construction such that the stem when connected to an inflatable rubber article, such as a tire tube, becomes, in effect, an integral part of the article, together with a method of constructing the valve stem which is expeditious, economical and comprises a minimum number of operative steps.

A further object is to provide a valve stem construction and a method of forming the same, wherein the base of the valve stem is formed of cords, threads, strings or the like and is fashioned or formed directly on the valve stem proper, wherefore the fashioned base can be positioned upon the raw rubber article and during the vulcanization or curing of the latter can be incorporated therein as an integral part of the article and the valve stem construction thus securely connected to the article.

Another object is to provide a valve stem construction and the method of forming the same and wherein the base of the stem is constructed or fashioned of cords, threads, strings, or the like secured to the valve stem proper in such manner that when the stem is connected to an inflatable rubber article and the base subjected to tension, the cords, threads or the like forming the base tighten upon the stem and become equalized with respect to each other.

Another object is to provide a valve stem construction wherein the base of the valve stem can be incorporated as an integral part of the inflatable rubber article and will possess the requisite strength to withstand all pull forces to which it would normally be subjected in use.

Another object of the invention is to provide a method of forming a valve stem wherein the base of the stem is constructed of cords, threads, string or the like and is fashioned or formed directly on the stem proper and such forming or fashioning of the valve stem base can be efficiently effected by operations arranged as operative steps in the production line for the manufacture of inflatable rubber articles, such as tire tubes, on a quantity production basis.

A further object is to provide a valve stem construction such that when it is associated with the inflatable rubber article with which it is used it is an integral part of the article and does not require the use of separate clamping members to connect it to the article.

Another object is to provide a valve stem construction wherein the stem proper is of such design that it can be made from rod stock substantially entirely by screw machining operations and by means of a single machine tool of well known construction, such as an automatic screw machine.

Further and additional objects and advantages not specifically referred to above will become apparent hereinafter during the detailed description of the invention which is to follow.

Referring to the accompanying drawings,

Fig. 11 is a diagrammatic sectional view illustrating the stem with the base fashioned or formed thereon after the strings, cords or the like which encircle the lower end of the base have been compressed or grouped, as shown in Fig. 9, such stem and base being mounted in the fixture or form shown in Fig. 4 and the base and the lower end of the stem being dipped in a bath of latex.

Fig. 12 is a perspective view of the valve stem construction after the base has been fashioned on the stem and has been treated in the latex bath and then stripped from the pins of the fixture or form.

Figure 1:
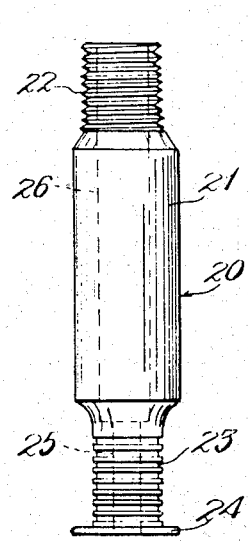
Fig. 1 is an elevational view of the valve stem proper before the base is fashioned or formed thereon.

Fig. 13 is a separated diagrammatic illustration of a portion of a raw rubber article, such as a tire tube, which is located in a mold, together with the valve stem construction shown in Fig. 12 in position to be placed over an opening in the tube, while a raw rubber patch is positioned over the stem, base and tube and above the patch a raw rubber strip is wound on the stem to form a projection embracing the lower end of the stem when the tube, patch and strip are vulcanized or cured in the mold and the base becomes an integral part of the tube.

Fig. 14 is a fragmentary sectional view through an inflatable rubber article, such as a tire tube, after the article, the patch and strip have been vulcanized or cured and the base of the valve stem has been embedded in the material of the patch and tube and becomes an integral part thereof.

Fig. 15 is a view similar to Fig. 14 but shows a metal ferrule arranged on the rubber projection that encircles the lower end of the stem proper.

Fig. 16 is a view similar to Fig. 14 but discloses the valve stem construction as secured or integrally incorporated into a patch, as distinguished from the tube, so that the stem and its associated patch can be vulcanized to an inflatable article, such as a tire tube; in other words, the construction illustrated in Fig. 16 shows the valve stem construction embodying the present invention employed for replacement purposes as distinguished from being incorporated in the article during the manufacture of the latter.

Fig. 17 is a bottom plan view on a reduced scale of the construction shown in Fig. 16, with a portion of the Holland cloth on the bottom of the patch turned back, and Fig. 18 is a view similar to Fig. 14 and illustrates a further modified form of the valve stem construction.

The present invention contemplates a valve stem construction for inflatable rubber articles, such as tire tubes, and a method of forming the valve stems such that the valve stem construction embodies a flexible base formed of cords, threads, strings or the like and which is fashioned or formed directly upon the stem proper. The base with the attached stem proper can then be positioned upon the uncured or raw inflatable article preparatory to curing the latter in the curing mold and an uncured or raw rubber patch placed over the stem, base and article and then when the article is placed in the mold and the latter is closed and the article is cured, the patch, base and article become an integral vulcanized construction. The base is so formed or fashioned as to have large spaces or openings between the threads, cords or strings thereof, wherefore during the vulcanization of the article and patch the material thereof can pass through the openings or spaces and thus the base is securely connected to the article and patch and, as has been previously stated, becomes an integral part thereof. The base is also so formed or fashioned that when the stem is attached to the inflatable rubber article and the base is subjected to tension or pull, the cords, threads, strings or the like forming the base tighten upon the stem proper and thus securely hold the latter in position and resist the action of the pull forces with sufficient strength to withstand all pull forces to which the valve stem construction and article would be normally subjected in use. The method of constructing the valve stem is such that it readily lends itself to quantity production, and, in fact, can be incorporated as operative steps of a production line for the manufacture of tire tubes or other inflatable rubber articles on a quantity production basis.

In order to explain the valve stem construction embodying the present invention and a simple manual method of forming the construction, reference will now be had to the accompanying drawings.

The valve stem proper illustrated herein and now about to be described, is formed of metal although it will be understood that there may be instances wherein it will be desirable to form the valve stem proper of rubber or other material and the present invention so contemplates.

In Fig. 1 the valve stem proper 20 is illustrated and this stem comprises an enlarged cylindrical portion 21 intermediate reduced end portions 22 and 23. The reduced end portion 22 is threaded interiorly and exteriorly and constitutes a nipple for the reception of a valve cap not shown. The reduced portion 23 is provided with a plurality of circumferential grooves and has at its end a circular flange 24. The valve stem proper is provided with a bore extending therethrough and consisting of a portion of relatively small diameter, as indicated at 25, and a portion of relatively large diameter, as indicated at 26 in Fig. 1, it being understood that the usual valve insides or core is located in the portion 26 of the bore and may be held therein by means of the usual threaded plug which is screwed into the internally threaded nipple or portion 22 of the stem, as is well understood in the art. The diameter of the flange 24 on the lower end of the stem is substantially the same as the diameter of the enlarged central portion 21 of the stem, and it will be noted that the stem proper can be readily constructed from rod stock by simple screw machining operations combined with drilling operations for the formation of the bore through the stem. As a matter of fact the valve stem proper lends itself admirably for production upon well known commercial forms of machine tools, such as automatic screw machines and can be produced rapidly and economically in quantity production lots.

In the ordinary type of valve stem it will be remembered that the stems are usually provided at their inner ends with flanges or heads greatly exceeding the largest diameter of the stem and this fact results in increasing the cost of production of the stems since they cannot be turned out by simple screwmachining operations upon a single machine, but require upsetting and other operations in their production.

Figure 2:
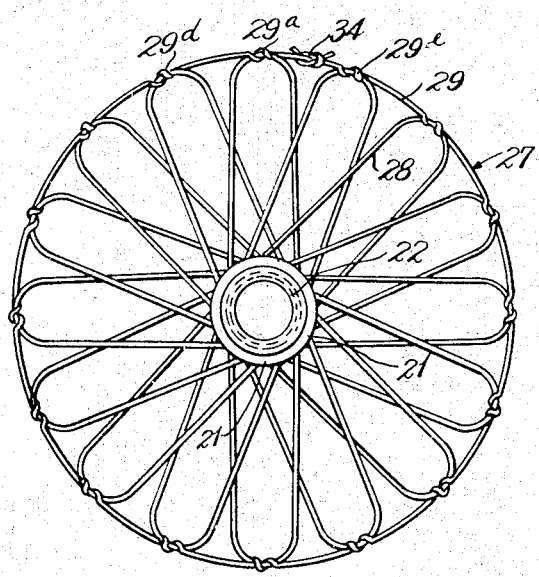
Fig. 2 is a top plan view of the valve stem construction embodying the present invention and illustrates the stem proper with the base fashioned or formed thereon.

The base of the valve stem construction is indicated in Fig. 2 by the numeral 27 and comprises a flexible base formed or fashioned of cords, threads, strings or the like and fashioned or formed directly upon the reduced portion 23 of the stem proper.

Briefly, the base is constructed of a continuous cord, thread or string 28, which is connected to the reduced portion 23 of the stem proper and extends therefrom outwardly in a plurality of radially extending loops, the inner ends of which turn about or encircle and tightly grip the reduced portion 23 of the stem proper and the outer ends or bights of which are connected by a cord, thread or string 29 which extends in a plurality of turns around the ends or bights of each of the loops of the cord 28.

The base 27 in actual production will be fashioned or formed on the stem proper by means of suitable machines, either automatic or semi-automatic, wherefore the fashioning or forming of the bases can be carried out expeditiously and economically in quantity production. The machines referred to can be incorporated into the production line for the manufacture of inflatable rubber articles, and the fashioning or forming of the bases may constitute one of the operative steps in such production line.

However, in order to explain the method embodying the present invention in a simplified way, resort will be had herein to a description of the manner in which the bases can be fashioned or formed manually upon a suitable fixture or form, it being understood that such fixture or form would constitute one of the elements in the automatic or semi-automatic machines referred to.

Figures 3, 4, 10:
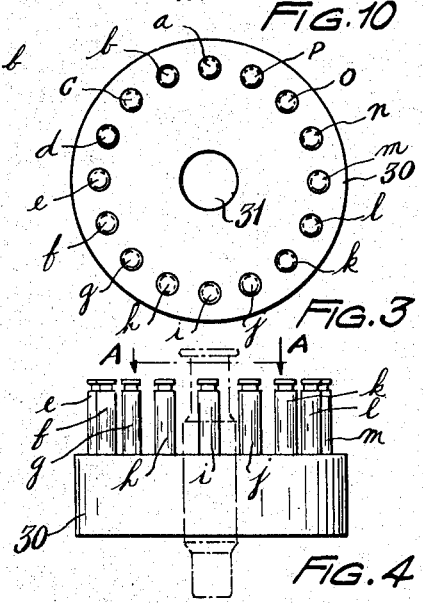
Fig. 3 is a top plan view of a fixture or form which can be used in the fashioning of the base upon the stem proper, the stem proper not being shown in this view.
Fig. 4 is a side elevational view of the fixture or form shown in Fig. 3, the stem proper being indicated in the position it occupies in the fixture or form by dot and dash lines.
Fig. 10 is a view similar to Fig. 8 but shows the extreme lower end of the stem as provided with a thin rubber washer or gasket into which are compressed the cords, threads or strings of the base.

The fixture or form which may be used to fashion or form the bases is illustrated in Figs. 3 and 4 and comprises a disc or block 30 provided with a centrally disposed opening 31 of such size that the portion 21 of the valve stem proper can be forced into the opening and the stem proper held in the position indicated by dot and dash lines in Fig. 4.

One face of the disc or block 30 is provided with a plurality of outwardly extending pins represented by the letters a to p inclusive, such pins being equally spaced circumferentially and arranged concentrically with respect to the opening 31. It will be understood that although sixteen pins are illustrated herein that various numbers may be employed as desired.

As previously stated, the stem proper is positioned in the opening 31 with the reduced portion 23 and the flange 24 at the end of the stem extending from the same face of the disc or block 30 as do the pins a to p inclusive. An end of the cord 28 is turned about the reduced portion of the stem and is secured to the stem by means of a suitable knot 32, the free end of the cord 28, as shown in Fig. 5, being carried radially outwardly and around the pin a.

Figures 5, 6:
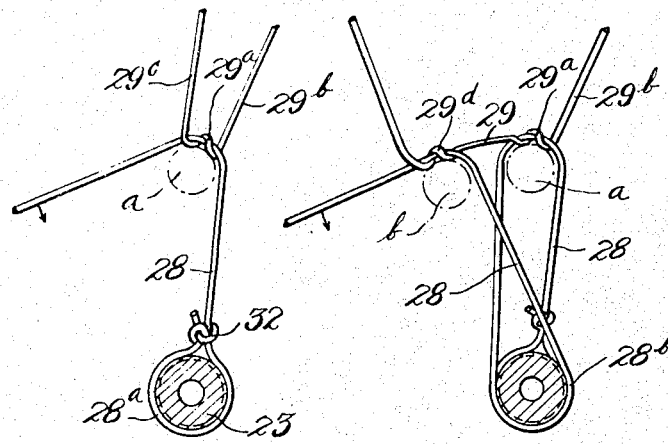
Fig. 5 is a detail somewhat diagrammatic view illustrating the manner in which the fashioning or formation of the base upon the stem proper is commenced, the stem proper being shown in horizontal section taken substantially on line A—A of Fig. 4, looking in the direction of the arrows.
Fig. 6 is a view similar to Fig. 5 but illustrates the fashioning or formation of the base upon the stem proper when the operation has progressed to the second pin of the fixture or form.

The cord 29 is turned around the portion of the cord 28 that extends around the pin a a plurality of turns, in the present illustration two such turns being shown, as indicated at 29a in Fig. 5, although a different number of turns might be employed if desired. It will be understood that the end 29b of the cord 29 preferably extends from a spool of cord, while the end 29c of the cord constitutes the working end thereof which is wrapped around the ends or bights of successive loops of the cord 28. After the cord 28 has been positioned around the pin a, as shown in Fig. 5, and the cord 29 turned twice about the bight of the loop of the cord 28, the free end of the cord 28 is swung inwardly, as indicated by the arrow in Fig. 5, and passes around the reduced portion 23 of the stem above and contacting with the turn 28a of the cord previously formed when the end of the cord is first attached to the stem.

Reference to Fig. 6 will indicate the manner in which the free end of the cord 28 is swung inwardly and around the reduced portion of the stem above the turn 28a previously formed therein, as indicated at 28b, and then passes radially outwardly to encircle the next pin (pin b) of the fixture, the fixture being indexed in a clockwise direction, if desired, to bring the pin b into the position previously occupied by the pin a. The free end 29c of the cord 29 is then passed twice around the cord 28 at the bight of the loop of the cord embracing the pin b to provide the two turns 29d corresponding to the turns 29a previously formed at the end of the first loop of the cord 28. The free end of the cord 28 which extends around the pin b is then swung inwardly in the direction of the arrow, as shown in Fig. 6, and passes around the reduced portion 23 of the stem above but in contact with the turn 28b previously formed by the cord, as explained in connection with Fig. 6. The free end of the cord 28 after it passses around the reduced portion 23 of the stem is carried radially outwardly and around the next pin (pin c) and the operation is continued until the cord 28 has been passed around each of the pins of the fixture and the cord 29 has been twice turned about the bight of each loop of the cord 28, it being understood, as previously explained, that the fixture may be indexed from pin to pin during the operation.

Figure 7:
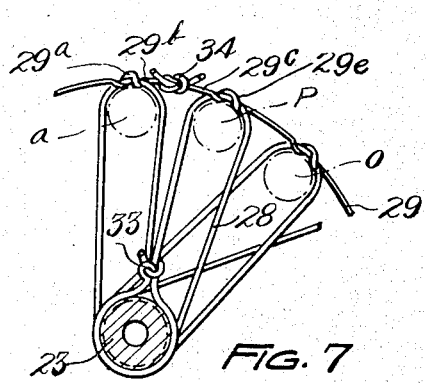
Fig. 7 is a view similar to Figs. 5 and 6 and illustrates the operation of fashioning or forming the base upon the stem proper at the conclusion of the fashioning or forming operation and after all the pins in the fixture have been utilized.

Fig. 7 illustrates the manner in which the cord 28 after it has passed around the last pin p of the fixture has its free end brought around the reduced portion 23 of the stem proper and then secured to the stem by the knot 33. It will also be noted that the free end 29c of the cord 29 is turned twice about the bight of the cord 28 around the pin p, as indicated at 29e and that then such free end is tied to the end 29b of the cord by the knot 34, as clearly shown in Fig. 7, it being understood that if the end 29b of the cord is connected to a spool of cord it will be severed for the formation of the knot 34.

Figure 8:
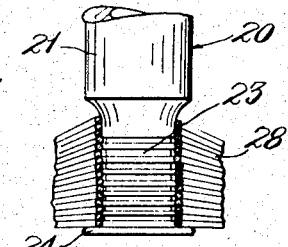
Fig. 8 is a fragmentary sectional view of the lower end of the valve stem proper and shows the manner in which the cords, threads or strings of the base encircle the lower end of the stem proper when the base is fashioned or formed on the stem.

When the base 27 has been fashioned on the stem and fixture, as just described, the turns of the cord 28 about the reduced portion 23 of the stem proper extend along the reduced portion 23 toward the flange 24 at the end of the stem, as indicated in Fig. 8. The radially extending loops formed by the cord 28 passing around the pins of the fixture and the reduced portion 23 of the stem are arranged so that they progress from the upper end of the reduced portion 23 in a spiral toward the flange 24 at the end of the stem, it being understood that the first loop formed around the pin a is the uppermost loop of the spiral, that is, it is remote from the flange 24, and that the last loop formed around the pin p is the lowermost loop of the spiral, that is, it is adjacent the flange 24. The turns of the cord 28 about the reduced portion 23 of the stem are now bunched or closely compacted adjacent the flange 24 of the stem, as clearly illustrated in the sectional view of Fig. 9 and the perspective view of Fig. 12.

Reference to Fig. 12 will indicate that when the turns of the cord 28 about the reduced portion 23 of the stem are bunched or compacted toward the flange 24, that, in effect, each of these turns is substantially in the form of a half hitch, wherefore when pull is exerted upon the radially extending loops the result is that the turns about the reduced portion of the stem are tightened upon the stem and their holding engagement therewith is increased.

In Fig. 10 of the drawings the reduced portion 23 of the stem is shown as provided with a thin rubber gasket 23a arranged adjacent the flange 24. A number of the turns of the cords 28 when the base is fashioned upon the stem engage the gasket 23a and embed themselves in the material of the gasket. Although the use of the gasket is not necessary it has been illustrated herein, inasmuch as its use would as a matter of fact increase the efficiency of the air seal between the base, the rubber article and the stem. The gasket 23a could be formed of raw or partially cured rubber and cured in position upon the stem.

Figure 9:
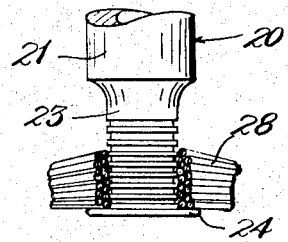
Fig. 9 is a view similar to Fig. 8 but shows the cords, strings or threads which extend around the lower end of the stem as having been bunched or moved from the position they occupy in Fig. 8 into a closely grouped or compacted arrangement adjacent the extreme lower end of the stem.

It will be understood that the turns of the cord 28 about the reduced portion 23, as shown in Fig. 10, would be grouped or bunched about the gasket 23a in the manner shown in Fig. 9. After the base has been fashioned or formed on the stem and fixture and the turns of the cord 28 about the stem bunched or grouped as shown in Fig. 9, the base and the lower end of the stem while still in the fixture are dipped or immersed in a suitable bath, such as latex, liquid rubber, rubber cement or other suitable solution as indicated at 35 in Fig. 11. It will be understood that in place of dipping the base in a bath of the solution that the solution might be sprayed or otherwise placed upon the base to coat the cords thereof with the solution. When the base is removed from the bath the surplus solution adhering to the base and filling the openings between the loops forming the base is removed by a suitable operation, as for example, by subjecting the base to a blast of air under pressure or some other suitable means. The solution adhering to the base is then dried, it being understood that in actual production and especially where the base is formed as part of the production line in the manufacture of inflatable rubber articles, the drying of the solution can be carried out quickly by passing the base, fixture and stem through a suitable drier. It will also be understood that prior to the treatment of the base in the solution bath, the base can be removed from the fixture by being slipped therefrom onto a suitable form to hold the same in shape, and this would probably be done when the method is carried out by means of automatic or semi-automatic machines. As soon as the solution adhering to the base has dried, the base and stem are stripped from the fixture or from the form upon which the base has been slipped, as the case may be, and when this operation has taken place the valve stem construction will appear as illustrated in Fig. 12, it being understood that the solution upon the base holds the latter in shape and substantially flat so that it can be positioned upon a raw inflatable rubber article preparatory to curing the latter in a curing mold.

Referring to Fig. 13, a portion of a raw inflatable rubber article is indicated at 36, and it will be understood that said article is to be arranged in a suitable and well known curing mold not shown. The base 27 of the stem is positioned upon the article, and if the latter is provided with an opening as indicated at 37, the base 27 is so positioned that the bore through the valve stem will register with the opening. In some instances, however, the raw inflatable rubber article may not be provided with an opening, and hence the base can be positioned upon the article in any desired location. In the instance just referred to the article can be subsequently provided with an opening by means of a suitable electric needle, for example, which can be passed inwardly through the valve stem.

When the base 27 has been positioned upon the raw inflatable rubber article, a raw rubber patch indicated at 38 in Fig. 13 is passed downwardly over the stem 20 until it overlies the base and article. If in the completed valve stem construction a rubber projection is to be provided surrounding the reduced portion 23 of the stem proper, or a sufficiently thick rubber pad placed over the assembly which will flow and form boss and pad, a strip 39 of raw rubber is wrapped around the stem above the patch 28, or a sufficiently thick rubber patch 38 may be used which will flow and form the boss. When this has been done the article with the associated elements is placed in the mold and the mold is closed and the article, patch and strip are then vulcanized or cured in the mold, which operation causes the material of the article, patch and strip to integrally unite.

It will be understood that during the vulcanization thus referred to and the uniting of the material of the article and patch, such material flows through the open spaces of the base and integrally unites or incorporates the base as a unitary part of the structure of the article. It will be noted that the spaces formed by the loops of the base and the spaces between the various loops of the base are of substantial size, wherefore the body of the material passing through such spaces or openings is likewise of substantial size, and hence the strength of the attachment between the base and the article is greatly increased. Inasmuch as the base has been previously treated with the solution, the material of the article and patch firmly adheres to the cords forming the base and, therefore, the uniting of the base to the article is facilitated and the strength of such union is assured.

In most instances it will be desirable to treat the base after it has been immersed in the solution bath and dried with an accelerated rubber cement to increase the adherence of the material of the article and patch to the cords forming the base. After the article, patch and strip have been vulcanized or cured, the base, as previously stated, becomes an integral part of the article as clearly shown in Fig. 14.

It will be understood that the mold in which the curing is carried out is provided in a well known manner with a configuration such that the strip 39 will be pressed around the reduced portion 23 of the stem to form a projection 39a, as shown in Fig. 14, which becomes an integral part of the article.

From the foregoing description it will be seen that a valve stem construction formed in the manner described and united to an inflatable rubber article during the vulcanization of the latter is so securely connected to the article as to be capable of withstanding all pull forces to which it would normally be subjected. In this connection it will be remembered that the turns of the cord 28 of the base about the valve stem proper are in the form of half hitches, wherefore when the base is subjected to pull forces the half hitches will tighten about the stem and the only way in which the stem might be pulled from the tube and base would be by the breakage of the cords of the base. However, it will be readily apparent that due to the large number of loops in the base, the effect of such pull forces will be borne by a multitude of the separate lengths of the cords forming the base and will thus be so distributed and equalized that all danger of breaking the cords under normal pull forces is obviated. It will further be observed that since the stem and base, in effect, are an integral part of the structure of the article, there will be no leakage of air around the base or between the base and stem.

It is necessary in attaching valve stems having cured or partly cured rubber bases to tire tubes or other articles, to first buff or smooth down the surfaces of the bases which are to be placed against the articles and vulcanized thereto, in order to obtain a proper adherence between the bases and the articles. In practicing the present invention it is unnecessary to perform any buffing operation upon the base of the valve stem or upon the article in order to obtain a good adherence between the base and stem since the base is arranged between the raw article and the raw patch prior to said elements being cured or vulcanized.

In some instances it may be desirable to provide the projection 39a with a metal ferrule, as indicated at 40 in Fig. 15, to prevent the edge of the opening in a tire rim from cutting into the projection 39a. It will be understood that such ferrule 40 can be forced over the projection 39a and held thereon by friction, or it may be positioned upon the projection and crimped in place thereon.

In order to enable a valve stem construction embodying the present invention to be employed as a replacement stem upon an inflatable rubber article, such as a tire tube, as distinguished from originally being incorporated therein during the manufacture of the article, the base 27 of the stem may be positioned between two suitably shaped rubber patches indicated at 41 and 42 in Fig. 16 and integrally united or embedded in such patches when the latter are vulcanized together. When it is desired to attach the valve stem construction to a finished tire tube or other inflatable rubber article, for example, as a replacement stem for the article, the protective cloth covering 43 on the underside of the patch 41 is removed and the patch positioned in the desired location upon the article and then vulcanized thereto in the usual and well known manner of vulcanizing patches to rubber articles.

The term "cord" employed herein and in the claims is intended to include cords, threads, strings, wires, or any other flexible and pliable element which can be employed to fashion a base of the character illustrated herein directly upon the stem proper while the latter is held in a suitable fixture.

Fig. 18 illustrates a further form which the valve stem construction may take. In this form the base is the same as heretofore explained while the stem proper is provided at its inner end with two flanges 24a and 24b spaced slightly apart. The base is fashioned on the stem above the flange 24a. When the valve stem is secured to the article the material of the article fills the space between the flanges and interlocks with the stem proper, thereby assuring an air-tight connection between the stem proper and the article.

Although preferred embodiments of the invention have been illustrated and described herein, it will be understood that the invention is susceptible of various modifications and adaptations within the scope of the appended claims.

Having thus described our invention we claim:

1. A method of constructing a valve stem for inflatable rubber articles which comprises mounting the tubular stem proper in a suitable fixture and then while the stem proper is held in the fixture fashioning directly on the inner end of the stem proper a flexible base by forming a plurality of radially extending cord loops the inner ends of which turn about and tightly engage the stem proper, and interconnecting the outer ends of the loops by a cord extending circumferentially of the base and turned about the bight of the loops.

2. A method of constructing a valve stem for inflatable rubber articles, which comprises mounting the tubular stem proper in a suitable fixture that is provided with a plurality of circumferentially spaced pins arranged concentrically with respect to the stem proper, and then while the stem proper is held in the fixture fashioning a flexible base directly thereon by forming a plurality of cord loops, the opposite ends of which embrace respectively the stem proper and the pins and simultaneously forming a plurality of turns about the outer bight of each loop with a cord extending circumferentially of the base to interconnect the loops.

3. A method of constructing a valve stem for inflatable rubber articles which comprises mounting the tubular stem proper in a suitable fixture that is provided with a plurality of circumferentially spaced pins arranged concentrically with respect to the stem proper, then while the stem proper is held in the fixture fashioning a flexible base directly thereon by forming a plurality of cord loops, the opposite ends of which embrace respectively the stem proper and the pins and simultaneously forming a plurality of turns about the outer bights of each loop with a cord extending circumferentially of the base to interconnect the loops, and then coating the cords of said base with a suitable material to which rubber readily adheres.

4. A method of constructing a valve stem for inflatable rubber artitcles which comprises mounting the tubular stem proper in a suitable fixture, then while the stem proper is held in the fixture fashioning directly on the inner end of the stem proper a flexible base by forming a plurality of radially extending cord loops the inner ends of which tightly embrace the stem proper, interconnecting the outer ends of the loops by a cord extending circumferentially of the base and turned about the bights of the loops, and then coating the cords of said base with a suitable material to which rubber readily adheres.

5. A method of constructing a valve stem and securing the same to an inflatable rubber artitcle which comprises mounting a tubular stem proper in a suitable fixture, then while the stem proper is held in the fixture fashioning directly on the inner end of the stem proper a flexible base formed of cords, coating said base with a material to which rubber readily adheres, drying the base, positioning the base upon the raw inflatable rubber article, placing a raw rubber patch over the base and article, and then vulcanizing the article and patch together to cure the same and to embed the base therein and integrally unite it therewith.

6. A method of constructing a valve stem for inflatable rubber articles which comprises mounting in a suitable fixture a stem proper having a flange at its inner end and a reduced portion adjacent said flange, then fashioning directly on the stem while in the fixture a flexible base by forming a plurality of radially extending cord loops the inner ends of which tightly embrace said reduced portion and are successively arranged longitudinally of said reduced portion, and then compacting said inner ends of the loops longitudinally of the reduced portion to adjacent said flange.

7. A method of constructing a valve stem for inflatable rubber articles which comprises mounting in a suitable fixture a stem proper having a flange at its inner end and a reduced portion adjacent said flange, then fashioning directly on the stem while in the fixture a flexible base by forming a plurality of radially extending cord loops the inner ends of which tightly embrace said reduced portion and are successively arranged longitudinally of said reduced portion, interconnecting the outer ends of the loops by a circumferentially extending cord, and then compacting said inner ends of the loops longitudinally of the reduced portion of the stem proper to adjacent said flange.

8. A method of constructing a valve stem for inflatable rubber articles which comprises mounting in a suitable fixture a stem proper having a flange at its inner end and a reduced portion adjacent said flange, then fashioning directly on the stem proper while in the fixture a flexible base by forming a plurality of radially extending cord loops the inner ends of which tightly embrace said reduced portion and are successively arranged longitudinally thereof, interconnecting the outer ends of the loops by a circumferentially extending cord, then compacting said inner ends of the loops longitudinally of the reduced portion of the stem proper to adjacent said flange, and then coating the flexible base with a material to which rubber readily adheres.

9. A method of constructing a valve stem for inflatable rubber articles and for securing the same thereto which comprises mounting in a suitable fixture a stem proper having a flange at its inner end and a reduced portion adjacent said flange, then fashioning directly on the stem proper while in the fixture a flexible base by forming a plurality of radially extending cord loops, the inner ends of which tightly embrace said reduced portion and are successively arranged longitudinally thereof, interconnecting the outer ends of the loops by a circumferentially extending cord, then compacting the said inner ends of the loops longitudinally of the reduced portion of the stem proper to adjacent said flange, coating the flexible base with a material to which rubber readily adheres, drying the coated base, then positioning the base upon the raw inflatable rubber article, placing a raw rubber patch over the base and article, and then vulcanizing said article and patch together to cure the same and to embed the base therein and integrally unite it therewith.

10. A method of constructing a valve stem for inflatable rubber articles which comprises mounting a stem proper in a suitable fixture having a plurality of circumferentially spaced pins arranged concentrically to said stem proper, securing a cord to said stem proper and turning the same successively about said stem proper and said pins to form a plurality of radially extending loops the inner ends of which tightly embrace said stem proper, and as the cord is turned about each pin taking a plurality of turns about it with another cord that extends circumferentially of the outer ends of the loops.

11. A valve stem for an inflatable rubber article comprising a stem proper and a flexible base, said base having a plurality of radially extending cord loops the inner ends of which tightly embrace said stem proper.

12. A valve stem for an inflatable rubber article comprising a stem proper and a flexible base, said base having a plurality of radially extending cord loops the inner ends of which tightly embrace said stem proper and the outer ends of which are interconnected by a cord extending circumferentially of the base.

13. A valve stem for an inflatable rubber article comprising a stem proper having at its inner end a flange and a reduced portion adjacent said flange, and a flexible base having a plurality of radially extending cord loops the inner ends of which tightly embrace said reduced portion of the stem proper.

14. A valve stem for an inflatable rubber article comprising a stem proper having a flange at its inner end, and a flexible base having a plurality of radially extending cord loops the inner ends of which tightly embrace said stem proper and are arranged in a closely compacted group adjacent said flange and constitute in effect a plurality of half hitches about the stem proper.

15. In a valve stem for an inflatable rubber article, a stem proper having an annular flange adjacent its inner end, and a flexible base comprising a plurality of radially extending cord loops the inner ends of which tightly embrace said stem proper and are arranged in a closely compacted group adjacent said flange and constitute in effect a plurality of half hitches about the stem proper, a circumferentially extending cord interconnecting the outer ends of said loops, and a coating of material to which rubber readily adheres on the cords forming the base.

16. In combination with an inflatable rubber article, a valve stem therefor comprising a stem proper, and a flexible base, said base having a plurality of radially extending cord loops the inner ends of which tightly embrace said stem proper, the said loops being so formed and arranged as to provide openings of substantial size through the loops and between adjacent loops, the said base being embedded in the material of the article which extends through said openings and surrounds the cord loops.

WILLIAM F. GOFF.
ADELBERT E. BRONSON.